INVENTOR
Noriyoshi Ando
BY Cushman, Darby & Cushman
ATTORNEYS

United States Patent Office 3,606,490
Patented Sept. 20, 1971

3,606,490
ANTI-SKID CONTROL SYSTEM FOR AUTOMOTIVE VEHICLES
Noriyoshi Ando, Kariya-shi, Japan, assignor to Nippon Denso Company Limited, Kariya-shi, Japan
Filed Dec. 17, 1968, Ser. No. 784,351
Claims priority, application Japan, Jan. 25, 1968, 43/4,521; Apr. 8, 1968, 43/23,255
Int. Cl. B60t 8/08
U.S. Cl. 303—21BE                              10 Claims

ABSTRACT OF THE DISCLOSURE

An anti-skid control system for automotive vehicles, which is operative in such a manner that when the angular deceleration of the wheel has reached a value equal or higher than a first set value for which the angular deceleration is to be detected, a braking force applied to the wheel is released and at the same time said set value is elevated to a second higher set value, and further when the angular deceleration of the wheel has reached said set value and the wheel has stopped rotating, the released braking force state is maintained with the braking force being applied to the wheel again when the wheel has started rotating.

BACKGROUND OF THE INVENTION

The subject matter of this application is related to that of commonly assigned application No. 765,902 filed Oct. 8, 1968.

Field of the invention

The present invention relates to an anti-skid control system and more particularly to an anti-skid control system adapted for use with automotive vehicles.

Description of the prior art

Conventional anti-skid control systems for automotive vehicles have been designed solely with a view to reducing the running speed of a vehicle while keeping the wheels running during braking operation of the vehicle. Therefore, most of these anti-skid control systems are so designed that an angular deceleration of the wheel driving rotary shaft, which is in correlation to the peripheral deceleration m./sec.² of the wheel, is detected by a flywheel mechanism and the detected angular deceleration is made use of for the attenuation of the braking force being applied to the wheel by way of a hydraulically or electromagnetically operative transmission mechanism, whereby inoperability or irregular gyration of the vehicle due to binding of the wheels under an excessively large braking force can be avoided.

The conventional anti-skid control systems as described above, however, have a drawback in that the range of braking conditions under which an optimum braking operation can be obtained is substantially limited. This is so because the braking force on the wheels is released only for the period when a signal representing the wheel's angular deceleration is present and therefore, a satisfactory uniform anti-skid operation cannot be obtained under circumstances wherein the coefficient of friction between wheel and road surface varies greatly, such as on the surfaces of a concrete-paved road as opposed to a snowy frozen road.

For instance, when a set value for which the wheel's angular deceleration signal is to be detected is set so as to obtain an optimum braking force on the surface of a concrete-paved road which has a large coefficient of friction, the same angular deceleration detector will not be sharply responsive to a signal caused by skidding on the surface of a snowy frozen road which has a relatively small coefficient of friction. This is so even when the wheel braking force has once been released, because the angular deceleration detector is composed of a mechanical element, such as a screw, having large frictional force. In addition, it is inevitable for the wheels to be brought to a halt in an extremely short period of time due to a delay with which an exhaust system including a brake chamber operates.

Further, with conventional systems, the wheels frequently stop rotating on a slippery road surface, such as a frozen road surface, before the angular deceleration of the wheels reaches a set value (due to a delay in operation of a braking system, etc.) even after the wheel braking force is released upon energization of a solenoid valve. Since, in this case, an angular deceleration is no longer developed, a braking force is again imposed on the wheels and thus there is the danger of the vehicle skidding on the road with the wheels being completely bound.

Such problems of complete wheel stoppage may be eliminated by setting the set value at an extremely small angular deceleration level for which the wheel angular deceleration is to be detected. But on the other hand, there will then arise another problem in that the total braking distance for the vehicle becomes extremely long. This problem is particularly apparent on the surface of a concrete-paved road, thus diminishing the value of the anti-skid operation under many common circumstances.

SUMMARY OF THE INVENTION

An object of the present invention is to provide an anti-skid control system adapted for use with automotive vehicles, which comprises a generator for converting the rotational speed of a wheel into a direct-current voltage, a wheel rotation detecting circuit for detecting whether said wheel is rotating or not, a wheel angular deceleration detecting circuit connected to the output terminal of said generator for detecting the angular deceleration of said wheel from said direct-current voltage and a delay circuit to cause its output to a braking force releasing valve through a switch element with a certain time delay.

Another object of the present invention is to provide an anti-skid control system adapted for use with automotive vehicles, which comprises a generator for converting the rotational speed of a wheel into a direct-current voltage, a wheel rotation detecting circuit for detecting whether said wheel is rotating or not, a wheel angular deceleration detecting circuit connected to the output terminal of said generator for detecting the angular deceleration of the wheel from said direct-current voltage, and a delay circuit provided successively to said detecting circuit to give its output to a braking force releasing valve through a switch element with a certain time delay, the arrangement being such that a signal is given to the wheel angular deceleration detecting circuit by the closure of said switch element for changing a set value for which the angular deceleration of the wheel is to be detected and further wherein said wheel rotation detecting circuit is actuated by the closure of said switch element and stoppage of the wheel, the output of said detecting circuit being given to the braking force releasing valve through the switch element to keep it energized.

Still another object of the present invention is to provide an anti-skid control system adapted for use with automotive vehicles, which comprises a generator for converting the rotational speed of a wheel into a direct-current voltage, a wheel rotation detecting circuit for detecting whether said wheel is rotating or not, a wheel angular deceleration detecting circuit connected to the output terminal of said generator for detecting the angular deceleration of the wheel from said direct-current voltage, a delay circuit provided successively to said detecting circuit to give its output to a braking force releasing valve through a switch element with a certain time delay and a current conducting time limiting circuit disposed in said wheel angular deceleration detecting circuit for limiting the duration of closure of said switch element, the arrangement being such that said wheel angular deceleration detecting circuit and said switch element are connected with each other so as to give by the closure of said switch element a signal to the wheel angular deceleration detecting circuit for changing a set value for which the angular deceleration of the wheel is to be detected and a signal to said current-conducting time limiting circuit for limiting the duration of energization of the braking force releasing valve, and said wheel rotation detecting circuit is actuated by the closure of said switch element and stoppage of the wheel and the output of said detecting circuit is given to the braking force releasing valve through the switch element to keep it energized until the wheel starts rotating again.

According to the present invention, there are brought about the following excellent advantages:

(1) When the angular deceleration of the wheel is located between a first set value and a second set value as on a dry asphalt road surface, the braking distance can be shortened markedly by selecting the current-conducting time of the braking force releasing valve short and in accordance with the angular deceleration of the wheel.

(2) When the angular deceleration of the wheel exceeds the second set value as on a snowy frozen road surface, the vehicle can be braked while keeping the wheels rotating by conducting a current through the braking force releasing valve for the period when the angular deceleration of the wheel remains above said second set value.

(3) When the wheels have stopped on quick application of a braking force, the braking force can be released by energizing the braking force releasing valve by the output of the wheel rotation detecting circuit for a period until the wheels start rotating again.

(4) Therefore, there results the excellent advantage in that the vehicle can be braked always safely and efficiently even under a great range of conditions where the coefficient of friction of a road surface varies greatly.

(5) The angular deceleration of the wheel can be detected very quickly because a mechanical element, such as a screw of large frictional force, as in the conventional system is not used for the detection of the wheel angular deceleration.

(6) Since the wheel angular decelartion detecting circuit restores its original state quickly on account of the current-conducting time limiting circuit at the same time when the set value is changed, after the angular deceleration of the wheel has disappeared, and thereby the duration of energization of the braking force releasing valve is limited, intermittent advancing of the vehicle as will occur on a road surface of large coefficient of friction relative to wheel, such as on a dry asphalt road surface in particular, because of said restoring time being long, can be avoided completely and accordingly an excellent feeling of ride can be obtained during the anti-skid operation.

(7) In the present system, the wheel rotation detecting circuit is actuated by the closure of the switch element and stopping of the wheels, and the braking force releasing valve is maintained energized by the output of the detecting circiut through the switch element. Therefore, when the wheels have been stopped under an excessively large braking force, the braking force releasing valve is energized by the output of the wheel rotation detecting circuit and thereby the braking force can be released until the wheels start rotating again. Consequently, a loss of steerability or irregular gyration of the vehicle can be completely avoided and the vehicle can be braked always with a sense of security.

DESCRIPTION OF THE PREFERRED EMBODIMENTS

Figure 1:
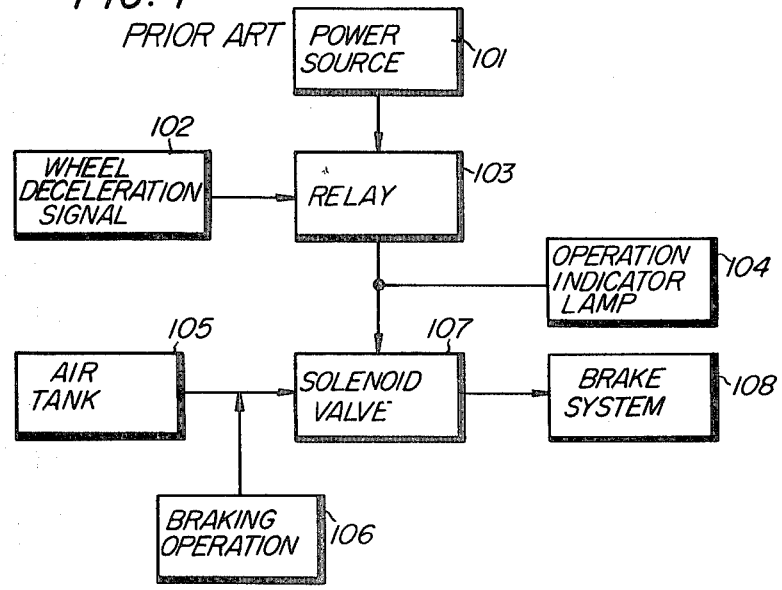
FIG. 1 is a block diagram illustrating a conventional anti-skid control system for automotive vehicles.
Figure 2:
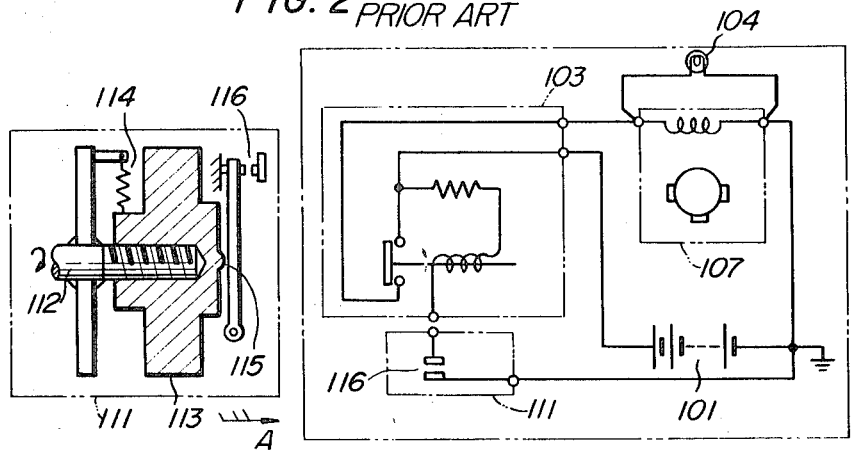
FIG. 2 is an electric connection diagram of a conventional electromagnetic anti-skid control system for automotive vehicles.

First of all, a conventional anti-skid control system for automotive vehicles will be described with reference to FIGS. 1 and 2. FIG. 1 is a system diagram of a conventional electromagnetic anti-skid control system adapted for use with a pneumatic braking system, an air-servo hydraulic braking system, etc. FIG. 2 is a view showing the structure of the wheel driving shaft angular deceleration detector in the system shown in FIG. 1 and an electric connection diagram including said detector. The angular deceleration detector 111 is operative in such a manner that when an angular deceleration occurs in a rotary shaft 112 connected to the wheel driving shaft, a torque is developed in a flywheel 113 and the flywheel 113 is rotated relative to the rotary shaft 112 until it overcomes a return spring 114, whereby the flywheel 113 is displaced. Since this rotational movement takes place along a thread on the rotary shaft 112, the flywheel is moved in the axial direction of the rotary shaft (in the direction of arrow A). The movement of the flywheel is amplified by a lever 115 to be used as a driving source for closing an electric contact 116. Numeral 103 designates a relay which relays a current from a power source 101 to a solenoid valve 107 upon closure of the electric contact 116. The solenoid valve 107 is a three-way change-over valve and operative in such a manner that is communicates an air tank 105 with a brake chamber in a deenergized state, while it communicates the brake chamber with an exhaust port in an energized state by closing the passage leading to the air tank. Numeral 104 designates a lamp indicating the solenoid valve 107 in operation. When a braking operation is put in effect with the arrangement described, air is fed into the brake chamber from the air tank 105 through the solenoid valve 107, applying a braking force to the wheels. When a predetermined angular decleration occurs in the rotary shaft 112, the solenoid valve 107 is energized, whereby the air pressure in the brake chamber is reduced with the braking force attenuating. Thus, it is possible to avoid stoppage of the wheel driving shaft. With such system, however, the scope of the braking conditions is extremely limited because the wheel braking force is released only for the period when the wheel angular deceleration signal is present.

Next, one embodiment of the present invention will be described with reference to FIGS. 1 to 5 inclusive.

Figure 3:
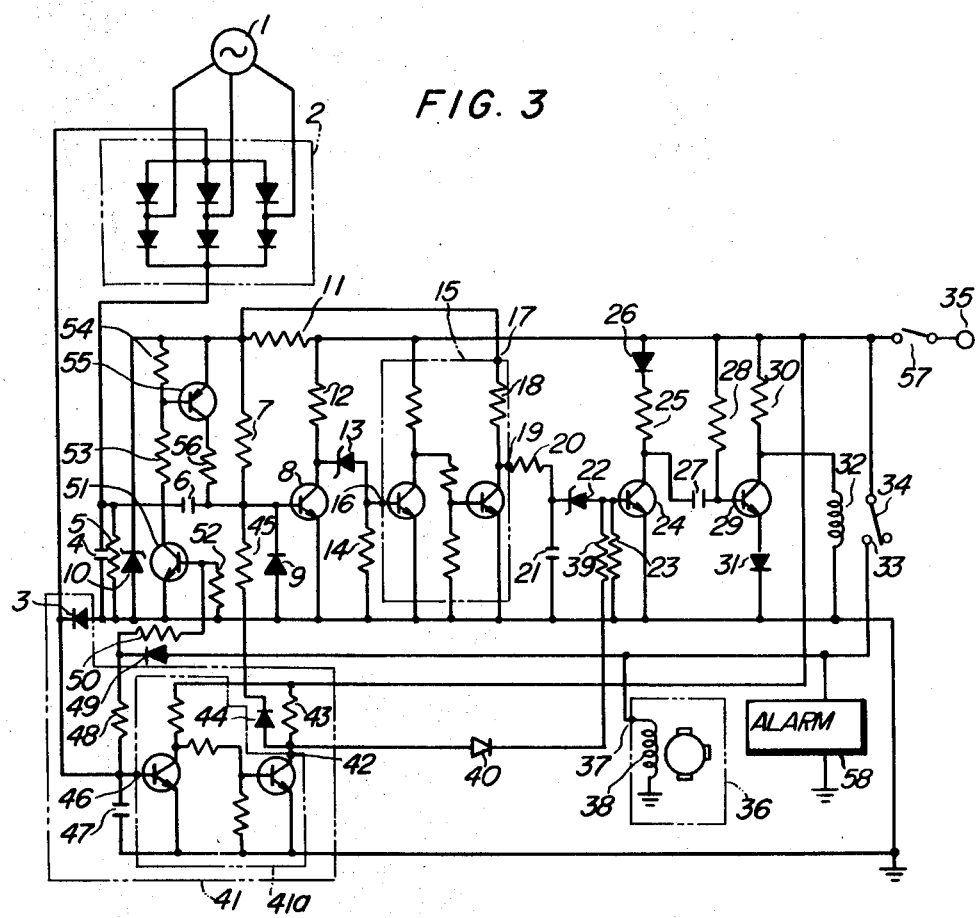
FIG. 3 is an electric connection diagram of an embodiment of the anti-skid control system for automotive vehicles according to the present invention.

Referring first to FIG. 3, a three-phase A.C. generator 1 has its rotor operatively connected to a wheel driving shaft, so as to generate an A.C. voltage in proportion to the rotation of the wheels. Numeral 2 designates a full-wave rectifying circuit and 3 designates a diode to detect whether the wheels are rotating or not. The diode 3 is interposed between the three-phase full-wave rectifying circuit 2 and the ground, so that a negative voltage may be developed on the negative electrode side of said diode 3 by the output of the three-phase A.C. generator 1 during rotation of the wheels. A condenser 4 and a resistor 5 form a smoothing circuit of the three-phase full-wave rectifying circuit 2, whereas a condenser 6 and a resistor 7 form a differentiation circuit thereof. The differentiation circuit serves to draw a change in the D.C. voltage upon smoothing by the condenser 4 and the resistor 5. A transistor 8 receives its base current through the resistor 7 and at the same time amplifies the signal voltage differentiated by the condenser 6 and the resistor 7. A diode 9 is inserted between the base of the transistor 8 and the ground for the purpose of preventing a large reverse voltage from being impressed across the base and emitter of said transistor upon discharge of a current stored in the condenser 6 when the peripheral speed of the wheels has dropped sharply. A constant-voltage diode 10 and a resistor 11 are provided for the purpose of always impressing a constant voltage across the opposite ends of the resistor 7 even when the source voltage of the vehicle fluctuates. Numeral 12 designates the collector resistance of the aforesaid transistor 8, 13 a constant-voltage diode and 14 a resistor. These elements are arranged such that when the transistor 8 is deenergized, a current flows from the power source to the resistor 14 through the collector resistance 12 and the constant-voltage diode 13, thereby to produce a signal voltage at the opposite ends of the resistor 14. Numeral 15 designates an amplifying circuit consisting of two transistors and 16 designates the input terminal of said amplifying circuit 15. Numeral 17 designates a constant voltage impressing point which is connected with the connection between the resistor 11 and the constant-voltage diode 10 and is always impressed with a fixed voltage. Numeral 18 designates a resistor and 19 designates the output terminal of the aforesaid amplifying circuit 15. The arrangement is such that when the signal voltage produced by the resistor 14 is impressed on the input terminal 16, a signal voltage of a fixed amplitude as determined by the constant-voltage diode 10 is produced. A resistor 20, a condenser 21, a constant-voltage diode 22 and a resistor 23 are arranged such that after the signal voltage is developed at the output terminal 19 of the amplifying circuit 15, a signal voltage is developed at the opposite ends of the resistor 23 with a certain time delay as determined by a delay circuit composed of the resistors 18 and 20, the condenser 21 and the constant-voltage diode 22. A transistor 24 is provided to amplify the signal voltage developed at the opposite ends of the resistor 23. Numeral 25 designates the collector resistance of the transistor 24 and 26 designates a diode which serves to prevent discharge of the condenser 27 when the source voltage has dropped. A resistor 28 cooperates with the condenser 27 to maintain the transistor 29 in the deenergized state for a certain period of time as determined by the capacitance of the condenser 27 and the resistance of the resistor 28 when said transistor 24 is shorted due to failure and also to deenergize said transistor 29 upon energization of the transistor 24 when said transistor 24 is in a normal state.

A resistor 30 and a diode 31 are inserted between the emitter of the transistor 29 and the ground for the purpose of preventing a reverse voltage from being impressed across the base and the emitter of said transistor 29 by the discharge of the condenser 27 when the transistor 24 has been shifted from the deenergized state to the energized state. Numeral 32 designates a solenoid, 33 a fixed contact and 34 a movable contact which is brought into a closed position in contact with the fixed contact 33 under the attractive force of said solenoid 32. A positive terminal 35 is connected to the positive electrode of a power source battery mounted on the vehicle. Numeral 36 designates a braking force releasing valve, 37 the input terminal of said valve and 38 a driving coil for opening and closing said valve. Numeral 57 designates a power source switch for supplying a power to the anti-skid control system for automotive vehicles according to the present invention when the switch is closed and 58 a buzzer connected in parallel with the driving coil 38 of the braking force releasing valve, which is adapted to generate warning to the operator of the vehicle when a vehicle braking force is released. The fixed contact 33 and the movable contact 34 act as a switch element to energize and deenergize the driving coil 38, and may be substituted by a power transistor or the like of a suitable size. The braking force releasing valve 36 is so designed as to function for releasing a vehicle braking force upon energization of the driving coil 38. A resistor 39 and a diode 40 are connected with each other in series, the other end of said resistor 39 being connected to the base of the transistor 24 and the other end of said diode being connected to the output terminal 42 of an amplifying circuit 41a of a wheel rotation detecting circuit 41. The wheel rotation detecting circuit 41 makes use of the negative voltage developed acros the opposite ends of the diode 3. Between the positive terminal 35 and the output terminal 42 of the amplifying circuit 41a is inserted a resistor 43. A diode 44 is connected in series with a resistor 45 and serves to energize the transistor 8 by impressing a signal voltage on the base of said transistor and thereby prevent a signal voltage from being impressed on the input terminal 16 of amplifying circuit 15 when the signal voltage is developed at the output terminal 42 of amplifying circuit 41a. Numeral 46 designates the input terminal of the amplifying circuit 41a, 47 a condenser, 48 a resistor and 49 a diode. The input terminal 46 of the amplifying circuit 41a is connected to the fixed contact 33 through the resistor 48 and the diode 49. The condenser 47 is inserted between the input terminal 46 of the amplifying circuit 41a and the ground for the purpose of eliminating an alternating current component in the D.C. voltage developed across the opposite ends of the diode 3. Numeral 50 designates a resistor, 51 a transistor and 52 a resistor. The resistor 50 has one end connected to the fixed contact 33 through the diode 49 and the other end to the base of transistor 51. The resistor 52 is connected between the base of transistor 51 and the ground and serves to prevent the base of transistor 51 from being opened in the open state of the fixed contact 33 and the movable contact 34. Numerals 53 and 54 designate resistors, 53 a transistor and 56 a resistor. The resistor 53 constitutes the collector resistance of the transistor 51 and also serves to supply a base current to the transistor 55 in the energized state of the transistor 51. The resistor 54 serves to prevent the base of transistor 55 from being opened when the transistor 51 is deenergized, and is connected between the base and emitter of the transistor 55. The emitter of the transistor 55 is connected with the connection between the constant-voltage diode 10 and the resistor 11. The resistor 56 constitutes a collector resistance of the transistor 55 and the other end thereof is connected with the base of transistor 8. The aforesaid differentiating circuit, transistor 8 and constant-voltage diode 13 form a wheel angular deceleration detecting circuit. When it is desired to form, together with the transistor 55, etc., a current conducting time limiting circuit for limiting the duration of energization of the braking force releasing valve 36, this may be accomplished by inserting a resistor and a condenser between the collector of transistor 55 and the base of transistor 8 in series with each other.

The system of this invention constructed as described above operates in the following manner. When a brake pedal is actuated to apply a braking force to the wheels with a view to reducing the running speed of the vehicle, the peripheral speed of the wheels drops sharply at a rate of deceleration related to the particular coefficient of friction between the wheels and the surface of the particular road on which said vehicle is currently running. Accordingly, the output of the three-phase A.C. generator 1 drops sharply, with the voltage across the terminals of the condenser 4 and the resistor 5 lowering. As a result, the condenser 6 starts to discharge the current stored therein, through the resistor 5 and the diode 9, so that the base current of the transistor 8 flowing through the resistor 7 is decreased. When the angular deceleration of the wheel reaches a value greater than a first set value as determined by the condenser 6 and the resistor 7, the transistor 8 is deenergized. The constant-voltage diode 13 is energized by the power source voltage impressed thereon and as a result a current flows from the positive terminal 35 through the resistor 12, the constant-voltage diode 13 and the resistor 14, developing a signal voltage across the opposite ends of said resistor 14. The signal voltage is amplified by the amplifying circuit 15 and appears at the output terminal 19 of said amplifying circuit 15 as a signal voltage of a fixed amplitude. Then, by said signal voltage another signal voltage is developed across the opposite ends of the resistor 23 after a certain period of time as determined by the resistors 18 and 20, the condenser 21 and the constant-voltage diode 22, so that the transistor 24 which is supplied with a base current by said signal voltage is energized and simultaneously the transistor 29 is deenergized. Therefore, a current flows to the solenoid 32 from the positive terminal 35 through the resistor 30, and the fixed contact 33 and the movable contact 34 are closed. Thus, a current passes through the driving coil 38 bringing the braking force releasing valve 36 into a position to release the vehicle braking force. Concurrently with the closure of the fixed contact 33 and the movable contact 34, a current flows into the base of transistor 51 from the positive terminal 35 through said contacts 34 and 33, the diode 49 and the resistor 50, whereby said transistor 51 is energized. A current also flows into the base of the transistor 55 from the positive terminal 35 through the resistor 53 to energize said transistor 55. Consequently, a second set value, higher than the first set value, is newly established by the condenser 6, the resistor 7 and the resistor 56, and at the same time, in case a resistor and a condenser are added in series between the collector of transistor 55 and the base of transistor 8 the base current recovery time of the transistor 8 is shortened by the action of the additional resistor and condenser, in addition to the energization of the transistor 55, whereby the period of energization of the braking force releasing valve 36 is limited. Upon passages of a short-period of time as determined by the magnitude of the angular deceleration developed in the wheel, the transistor 29 is re-energized, so that the current flowing through the solenoid 32 is interrupted again and the movable contact 34 is disengaged from the fixed contact 33. Therefore, the braking force releasing valve 36 is brought into a position to increase the braking force. The above-described action takes place because in the angular deceleration detecting circuit the current flowing through the base of transistor 8 through the resistor 7 is decreased by the current discharged by the condenser 6 in accordance with the angular deceleration developed in the wheel, when the first set value is changed to the second set value and simultaneously the energization period of the braking force releasing valve 36, and in case of addition of the above-mentioned resistor and condenser the transistor 8 is energized again after the lapse of a certain period of time which is determined by the resistance of the resistors 56 and the additional resistor and the capacitance of the additional condenser and also by the magnitude of the base current of transistor 8. When the contacts 33 and 44 are opened and closed repeatedly within a short time interval, the magnitude of the braking force is averaged and progressively decreases as compared with the case wherein the braking force releasing valve 36 is not operative at all, due to an operation delay of the brake system, etc. By repeating the above-described operation, it is possible to reduce the speed of the vehicle without having the wheels bound and without completely releasing the wheel braking force. If, on the other hand, the value of angular deceleration developed in the wheel is greater than the second set value when the first set value of wheel angular deceleration has been changed to the second set value, the base current of the transistor 8 is continuously maintained at a low level by the discharge current of condenser 6 and accordingly the voltage across the collector and emitter of said transistor 8 is maintained at a value approximating the power source voltage. Therefore, the fixed contact 33 and the movable contact 34 are successively held in closed position. As a result, the braking force releasing valve 36 is continuously held in the position to release the wheel braking force and thus the wheel angular deceleration is reduced to a value below the second set value. Now, if the angular deceleration of the wheel is located between the second set value and the first set value, the braking force releasing valve 36 is held in the position to apply the braking force to the wheels but the braking force is not immediately applied to the wheels due to the operation delay of the brake system, etc. and the wheel angular deceleration drops to the first set value. Then, the braking force is reapplied to the wheels for the first time and the wheel angular deceleration begins to rise again. Thereafter, the same operation is repeated, whereby it is possible to reduce the running speed of the vehicle without stopping the wheels. Next, when the rotating speed of the wheels has dropped with an angular deceleration higher than a predetermined value and thereafter the wheels have stopped rotating, the fixed contact 33 and the movable contact 34 are brought into closed position by virtue of the angular deceleration of the wheels during the braking operation before the wheels stop rotating, with the result that the braking force releasing valve 36 acts to release the wheel braking force. At the same time, the wheels stop rotating, whereupon the voltage across the opposite ends of the diode 3, a wheel rotation detecting element, disappears, allowing a current to flow from the positive terminal 35 to the input terminal 46 of the amplifying circuit 41a through the closed contacts 34, 33, the diode 49 and the resistor 48 and thus a signal voltage is developed at the output terminal 42 of said amplifying circuit 41a. This signal voltage is impressed on the base of transistor 24 through the diode 40 and the resistor 39, whereby the transistor 24 is maintained energized as in the case wherein a wheel deceleration signal is produced while the wheels are rotating. The fixed contact 33 and the movable contact 34 are successively held in closed position and the braking force releasing valve 36 acts to release the wheel braking force. The fixed contact 33 and the movable contact 34 are held in closed position even after the wheel angular deceleration signal disappears upon stoppage of the wheels, by virtue of the signal voltage developed at the output terminal 42 of the amplifying circuit 41a, so that in no case the braking force is applied to the wheels again with the wheels being held immovable. When the wheels start rotating again due to friction with the road surface, a voltage is developed across the opposite ends of the diode 3 and this voltage is impressed on the input terminal 46 of the amplifying circuit 41a. Therefore, a signal voltage is no longer developed at the output terminal 42 of said amplifying circuit 41a and no signal voltage is given to the base of transistor 24. Thus, the transistor 24 is deenergized and the transistor 29 resumes its energized state. Consequently, the current passing through the solenoid 32 is interrupted and the movable contact 34 is disengaged from the fixed contact 33, so that the braking force is immediately applied to the wheels. When the vehicle operator operates to close the power source switch 57 before the vehicle starts running, the base current of the transistor 8 supplied through the resistors 11 and 7 is cut off for a certain period of time given by a time constant which is determined by the resistance of the resistors 11 and 7 and the capacitance of the condensers 6 and 4, so that as similar to the case here above, a current flows into the solenoid 32, the fixed contact 33 and the movable contact 34 are closed, the braking force of the braking force valve 36 is released and at the same time, the buzzer 58 generates an alarm. At this time, it will not happen that the vehicle begins running due to the effect of a gradient road surface during such a short time interval of release of the braking force, because if the wheels starts rotating the braking force releasing valve 36 is deenergized due to operation of the wheel rotation detecting element circuit and the braking force is applied to the wheels again as described above. Further, in case for some reasons the power source switch 57 is opened and thereafter is closed again by the operator during running of the vehicle, the base current of the transistor 8 supplied through the resistors 11 and 7 does not flow into the condenser 6 since a D.C. voltage responsive to the vehicle speed is developed across the condenser 4, thus resulting in no release of the braking force. When an abnormal condition occurs in the anti-skid control system, the relay solenoid 32 is not energized and thus, the fixed contact 33 and the movable contact 34 are not closed and the buzzer 58 is also not energized, resulting in no generation of a warning.

As is clearly seen from the foregoing description, the operator of the vehicle can find out whether the anti-skid control system is in order or not by the absence or presence of a warning upon closing the power source switch before the vehicle starts running.

Figure 4A:
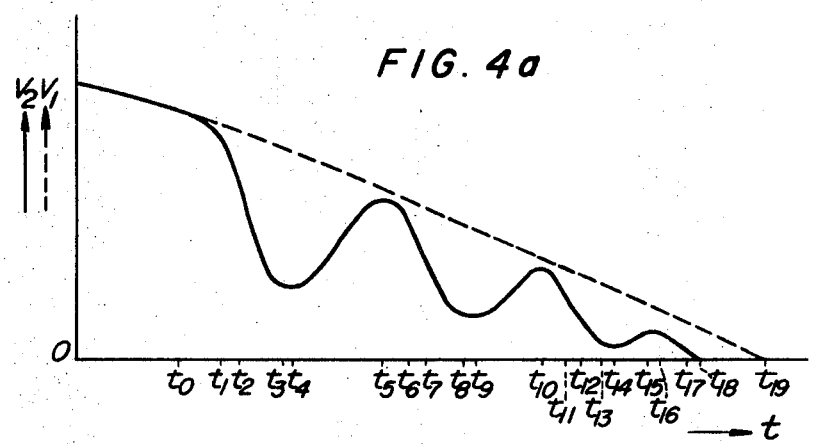
FIGS. 4a, 4b and 4c and FIGS. 5a, 5b and 5c are diagrams graphically illustrating the operation of the anti-skid system of this invention.
Figure 4B:
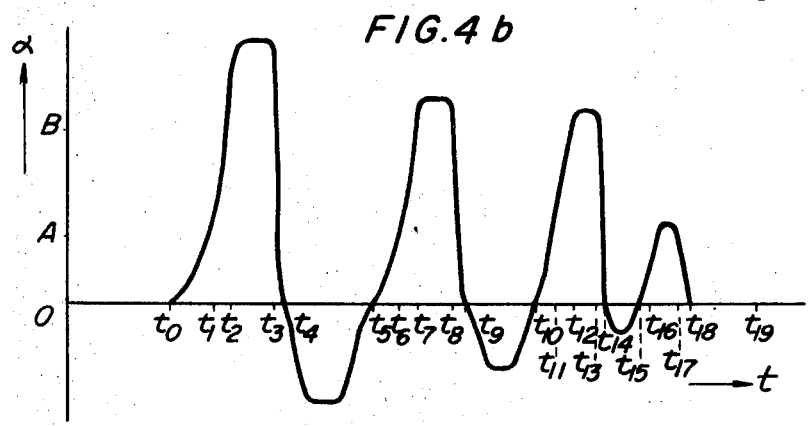
Figure 4C:
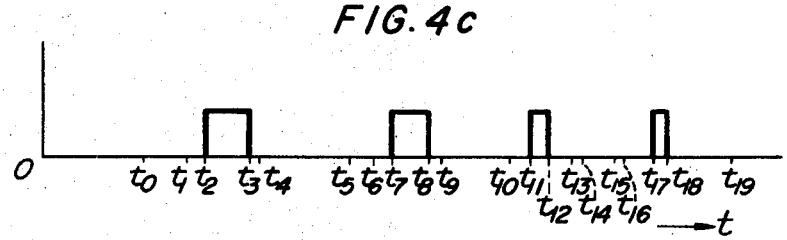
Figure 5A:
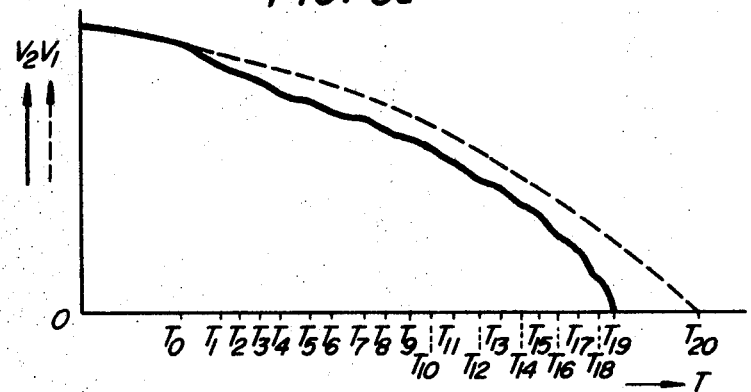
Figure 5B:
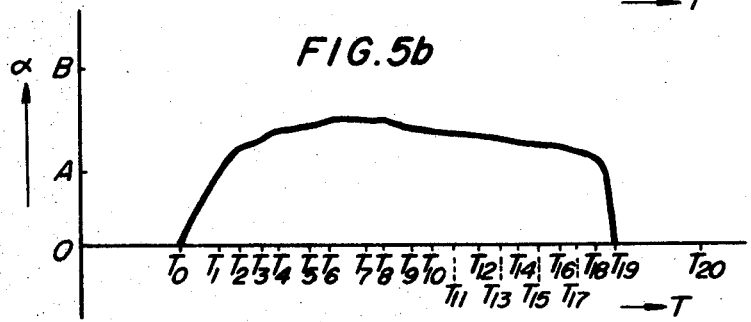
Figure 5C:
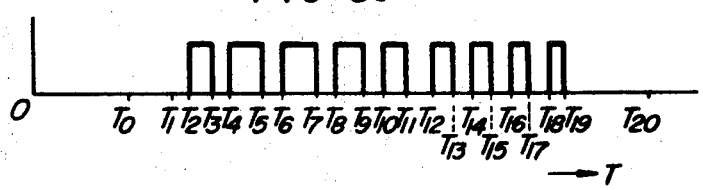

Now, the above-described operation will be further explained with reference to FIGS. 4a, 4b and 4c and FIGS. 5a, 5b and 5c. In the charts of FIGS. 4a and 5a wherein the ordinate represents vehicle speed $v_1$ and wheel peripheral speed $v_2$ and the abscissa represents time ($t$ in FIG. 4a and T in FIG. 5a), the process of a braking operation ranging from the time when a braking force is applied to the wheels by actuating the brake system to the time when the wheels and the vehicle have been brought to a halt, is shown by changes in the vehicle speed $v_1$ and the wheel peripheral speed $v_2$. In each chart, the broken curve represents the vehicle speed $v_1$ and the solid curve represents the wheel peripheral speed $v_2$. In the charts of FIGS. 4b and 5b which correspond to FIGS. 4a and 5a respectively, the ordinate represents wheel angular deceleration $\alpha$, with the first set value A and the second set value B marked thereon, and the abscissa represents time $t$ or T. FIGS. 4c and 5c which correspond to FIGS. 4a and 5a and FIGS. 4b and 5b respectively, show the closing time of the fixed contact 33 and the movable contact 34 in the form of a square pulse. First of all, a case wherein a braking force is applied to the wheels by actuating the brake system at a time $t_0$ when the vehicle is running on a slippery road surface, such as the surface of a frozen road or a wet asphalt road, will be described with reference to FIGS. 4a, 4b and 4c. In this case, the wheel peripheral speed $v_2$ drops quickly as shown in FIG. 4a. The wheel deceleration $\alpha$ having reached the first set value A is detected at a time $t_1$ by the wheel deceleration detecting circuit as shown in FIG. 4b. After a period of time as determined by the delay circuit, that is, the time from $t_1$ to $t_2$, a square pulse to bring the fixed contact 33 and the movable contact 34 into closed position is developed at a time $t_2$ as shown in FIG. 4c, and at the same time the braking force releasing valve 36 is actuated to release the wheel braking force and the set value of wheel angular deceleration $\alpha$ is changed from the first set value A to the second set value B higher than said first said value A. The amplitude of the square pulse is in proportion to the magnitude of the wheel angular deceleration. In this case, since the coefficient of friction between the wheels and the snowy frozen road surface is small, the angular deceleration occurring in the wheels becomes greater than the second set value B as shown in FIG. 4b and the braking force releasing valve 36 is continuously held in the position to release the wheel braking force even after the time $t_2$. Therefore, the wheel peripheral speed $v_2$ begins to rise and the braking force is applied again to the wheels at a time $t_3$ to lower the wheel peripheral speed. In practice, however, the braking force is not applied to the wheels immediately due to an operation delay of the brake system, etc. but the wheel peripheral speed rises in the period of operation delay of the brake system, that is, a period from the time $t_3$ to a time $t_5$, and the braking force is reapplied at the time $t_5$ for the first time. The wheel peripheral speed begins to lower until the wheel angular deceleration $\alpha$ exceeds the first set value A again at a time $t_6$ as shown in FIG. 4b. Thereafter, the above-described operation is repeated until the vehicle is brought to a halt.

Next, a case wherein the braking force is applied to the wheels at the time $t_0$ when the vehicle is running on a hardly slippery road surface, such as the surface of a dry asphalt road, will be explained with reference to FIGS. 5a, 5b and 5c. In this case, the wheel peripheral speed $v_2$ is progressively lowered as shown in FIG. 5a and the wheel angular deceleration $\alpha$, having reached the first set value A, is detected at a time $T_1$ by the wheel angular deceleration detecting circuit as shown in FIG. 5b. After a period of time as determined by the delay circuit, that is, the period from the time $T_1$ to a time $T_2$, a square pulse to close the movable contact 34 with the fixed contact 33 is generated at the time $T_2$ as shown in FIG. 5c, and at the same time the braking force releasing valve 36 is brought into the position to relieve the braking force and the set value of the wheel angular deceleration $\alpha$ is changed from the first set value A to the second set value B. In this case, since the coefficient of friction of the dry asphalt road surface relative to the wheels is large, the angular deceleration $\alpha$ occurring in the wheels is smaller than the second set value B as shown in FIG. 5b, so that the braking force releasing valve 36 acts to relieve the wheel braking force for the period from the time $T_2$ to the time $T_3$. Thereafter, the square pulse disappears at the time $T_3$ as shown in FIG. 5c, whereby the braking force is immediately applied to the wheels until the set value of wheel angular deceleration $\alpha$ returns to the first set value A. However, the fixed contact 33 and the movable contact 34 are held in the closed position for so short a period that the braking force imposed on the wheels cannot be sufficiently released even upon actuation of the braking force releasing valve 36, due to the operation delay of the brake system. Namely, the wheel peripheral speed $v_2$ lowers while maintaining a certain wheel angular deceleration $\alpha$. The wheel angular deceleration $\alpha$ has already reached the first set value A at the time $T_3$. Therefore, upon lapse of the predetermined period of time from the time $T_3$ to a time $T_4$, a square pulse to close the movable contact 34 with the fixed contact 33 appears again at the time $T_4$ as shown in FIG. 5c. The above-described operation is repeated until the vehicle is brought to a halt.

Figure 7:
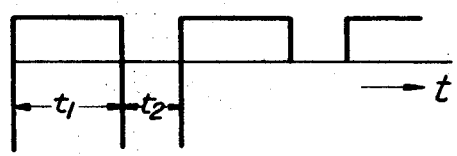
FIG. 7 is a wave diagram showing the closing time of the switch element in the form of a square pulse.

The operation of the present system will be further described with reference to FIGS. 6 and 7. The chart of FIG. 6 wherein the ordinate represents current-conducting time ratio T% and the abscissa represents wheel-angular deceleration $\alpha$ m./s.$^2$, shows the relationship between the wheel angular deceleration $\alpha$ and the current-conducting time ratio T of the braking force releasing valve 36 when a braking force is applied to the wheels upon actuation of the brake system. FIG. 7 shows by way of a square pulse the duration of a current conducted through the braking force releasing valve 36 upon closure of the fixed contact 33 and the movable contact 34, the axis of the abscissa representing time. In the figure, reference character $t_1$ indicates the period in which the contacts 33, 34 are closed, and $t_2$ indicates the period in which said contacts are opened. Here, the current conducting time ratio $$T = \frac{t_1}{t_1+t_2} \times 100\%$$

Figure 6:
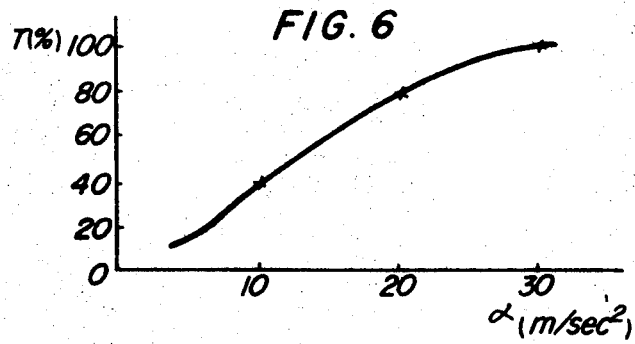
FIG. 6 is an electric characteristic diagram graphically showing the relationship between the wheel angular deceleration $\alpha$ and the current conducting time ratio T of a switch element in the system of this invention.

With reference first to the case wherein a braking force is applied to the wheels running on a slippery road surface, such as a snowy frozen road surface or a wet asphalt road surface, the current-conducting time ratio T is large as shown in FIG. 6 because the angular deceleration of the wheel is relatively large, and accordingly the current-conducting time of the braking force releasing valve 36 becomes long. On a dry road surface having a large coefficient of friction, on the other hand, the current-conducting time ratio T is small as shown in FIG. 6 because the angular deceleration developed in the wheel is relatively small, and accordingly the current-conducting time of the braking force releasing valve 36 becomes short. That is to say that the current-conducting time of the braking force releasing valve 36 varies in accordance with the coefficient of friction of the road surface on which the vehicle is travelling and therefore the vehicle is brought to a halt, always with an adequate braking force applied to the wheels.

The present invention will be further illustrated by way of example hereunder:

In a first example, the first set value of wheel angular deceleration was set at 0.7G (27 rad./sec.$^2$) and the second set value at 2G (80 rad./sec.$^2$) based on the wheel peripheral speed. The system was arranged such that in 100 m./sec. after the wheel angular deceleration reached the first set value, the braking force releasing valve 36 is energized and at the same time the first set value is shifted to the second set value. The starting point of the wheel rotation to be detected was set at 0.5 m./sec. (2 rad./sec.). The anti-skid control system set as described above was incorporated in an automotive vehicle having a weight of 11 tons and a satisfactory anti-skid operation was obtained in driving the vehicle on a dry asphalt road surface, a wet asphalt road surface and a snowy frozen road surface.

In a second example, the first set value of the wheel angular deceleration was set at 0.5G (20 rad./sec.$^2$) and second set value at 1.5G (60 rad./sec.$^2$), and further the current-conducting time ratio T was set such that it is 40% at a wheel angular deceleration of 1G (40 rad./sec.$^2$) and 80% at a wheel angular deceleration of 2G (80 rad./sec.$^2$). The system was arranged such that the braking force releasing valve 36 is energized 100 m./sec. after the wheel angular deceleration has reached the first set value and at the same time the first set value having been in effect is shifted to the second set value and further the current-conducting time of the braking force releasing valve 36 is limited in accordance with the magnitude of the wheel angular deceleration then produced in the wheel. The starting point of wheel rotation to be detected was set at 0.5 m./sec. With the system set as described above, a satisfactory anti-skid operation was obtained on a dry road surface and a snowy frozen road surface. It is to be noted that since the current-conducting time ratio T can be adjusted in accordance with the operation delay of a particular brake system used in a vehicle, the system of the invention is applicable to a vehicle which is equipped with a brake system having an operation delay different from that of the brake system used in the examples described above, with a satisfactory anti-skid operation.

I claim:

1. An anti-skid control system for use with automotive vehicles having wheels and a braking force releasing valve, which system comprises:
   a generator for converting the rotation speed of a wheel into a direct-current voltage,
   a wheel rotation detecting circuit for detecting whether said wheel is rotating or not and for inhibiting the reapplication of braking force when said wheel is not rotating after said braking force releasing valve has been energized,
   a wheel angular deceleration detecting circuit for detecting the angular deceleration of said wheel above a first set value, and
   a time delay circuit means for operative connection between said deceleration detecting circuit and said braking force releasing valve for supplying the output of said wheel deceleration detecting circuit to said braking force releasing valve through a switch element with a predetermined time delay thereby smoothing out any small noise signals and preventing spurious brake releases in response thereto.

2. An anti-skid control system for use with automotive vehicles having wheels and a braking force releasing valve, which system comprises:
   a generator for converting the rotation speed of a wheel into a direct-current voltage,
   a wheel rotation detecting circuit for detecting whether said wheel is rotating or not and for inhibiting the reapplication of braking force when said wheel is not rotating after said braking force releasing valve has been energized,
   a wheel angular deceleration detecting circuit for detecting the angular deceleration of said wheel above a first set value,
   a time delay circuit for operative connection between said deceleration detecting circuit and said braking force releasing valve for supplying the output of said wheel deceleration detecting circuit to said braking force releasing valve through a switch element with a predetermined time delay, and
   means for changing said first set value for which said wheel angular deceleration is to be detected to a second higher set value of deceleration upon closure of said switch element.

3. An anti-skid control system as defined in claim 2, wherein said wheel rotation detecting circuit is actuated by the closure of said switch element and by the stopping of rotation of said wheel, and said braking force releasing valve is maintained energized by the output of said wheel rotation detecting circuit supplied thereto through said switch element.

4. An anti-skid control system as defined in claim 2, wherein said wheel rotation detecting circuit is actuated by the closure of said switch element and by the stopping of rotation of said wheel, and said braking force releasing valve is maintained energized by the output of said wheel rotation detecting circuit supplied thereto through said switch element.

5. An anti-skid control system as defined in claim 2, wherein said wheel angular deceleration detecting circuit includes a current-conducting time limiting circuit for limiting the duration of closure of said switch element.

6. An anti-skid control system as in claim 4, further comprising a current-conducting time limiting circuit for limiting the duration of a current conducted through the braking force releasing valve.

7. An anti-skid control system as as in claim 4, wherein:
   said wheel rotation detecting circuit is actuated by the closure of said switch element and by the stopping of rotation of said wheel, and
   said braking force releasing valve is maintained energized by the output of said wheel rotation detecting circuit supplied thereto through said switch element until the wheel again starts rotating.

8. An anti-skid control system as defined in claim 5, wherein said wheel rotation detecting circuit is actuated by the closure of said switch element and by the stopping of rotation of said wheel, and said braking force releasing valve is maintained energized by the output of said wheel rotation detecting circuit supplied thereto through said switch element until the wheel starts rotating.

9. An anti-skid control system for use with automotive vehicles having wheels and a brake releasing valve, said system comprising:
  means for converting the rolling speed of a wheel into a speed signal,
  a wheel rotation detecting circuit for sensing whether said wheel is rotating or not,
  an angular deceleration detecting circuit for sensing angular deceleration of said wheel above a first set level,
  a time delay circuit for operative connection between said deceleration detecting circuit and said brake releasing valve to energize said brake releasing valve after a predetermined time delay upon detecting wheel deceleration in excess of said first set level,
  wherein said wheel rotating detecting circuit is adapted for energization when said brake releasing valve is energized and for maintaining said brake releasing valve energized if said wheel is not rotating, and
  wherein said angular deceleration detecting circuit includes means for changing said first set level to a second higher level of deceleration each time said brake releasing valve is energized.

10. An anti-skid control system as in claim 2 further comprising:
  alarm means connected for actuation simultaneously with actuation of said brake releasing valve.

References Cited
UNITED STATES PATENTS

| | | | |
|---|---|---|---|
| 3,237,996 | 3/1966 | Lucien | 303—21(BE) |
| 3,245,727 | 4/1966 | Anderson et al. | 303—21(A4) |
| 3,398,995 | 8/1968 | Martin | 303—21(A4) |
| 3,260,555 | 7/1966 | Packer | 303—21(BB) |
| 3,498,683 | 3/1970 | Leiber | 303—21 |

DUANE A. REGER, Primary Examiner

U.S. Cl. X.R.
188—181A; 303—20